US012798293B2

(12) United States Patent
Zhang et al.

(10) Patent No.: US 12,798,293 B2
(45) Date of Patent: Nov. 17, 2026

(54) UNIVERSAL WHEEL

(71) Applicant: Taizhou Wanlun Plastic Industry Co., Ltd., Taizhou (CN)

(72) Inventors: Xiaotian Zhang, Taizhou (CN); Liu Chen, Taizhou (CN)

(73) Assignee: Taizhou Wanlun Plastic Industry Co., Ltd., Taizhou (CN)

(*) Notice: Subject to any disclaimer, the term of this patent is extended or adjusted under 35 U.S.C. 154(b) by 0 days.

(21) Appl. No.: 19/245,837

(22) Filed: Jun. 23, 2025

(65) Prior Publication Data

US 2026/0054523 A1 Feb. 26, 2026

(30) Foreign Application Priority Data

Aug. 20, 2024 (CN) ......................... 202422041549.7

(51) Int. Cl.
*B60B 33/00* (2006.01)

(52) U.S. Cl.
CPC ...... *B60B 33/0086* (2013.01); *B60B 33/0021* (2013.01); *B60B 33/0042* (2013.01); *B60B 33/0057* (2013.01); *B60B 33/0068* (2013.01); *B60B 33/0076* (2013.01)

(58) Field of Classification Search
CPC ............ B60B 33/0086; B60B 33/0021; B60B 33/0042; B60B 33/0057; B60B 33/0068; B60B 33/0076; B60B 33/0049
USPC .......................................................... 16/35 R
See application file for complete search history.

(56) References Cited

U.S. PATENT DOCUMENTS

| | | | | |
|---|---|---|---|---|
| 4,664,231 | A * | 5/1987 | James | B60B 33/0042 188/69 |
| 4,681,192 | A * | 7/1987 | James | B60B 33/021 188/69 |
| 5,415,252 | A * | 5/1995 | Estkowski | B60B 33/0086 16/35 R |
| 5,632,360 | A * | 5/1997 | Melara | B60B 33/0068 16/35 R |
| 6,854,568 | B2 * | 2/2005 | Kun-Tsai | B60B 33/0002 188/29 |
| 7,516,512 | B2 * | 4/2009 | Tsai | B60B 33/023 16/33 |

(Continued)

FOREIGN PATENT DOCUMENTS

| | | | | |
|---|---|---|---|---|
| CN | 205469232 | U * | 8/2016 | |
| CN | 108638753 | A * | 10/2018 | B60B 33/0078 |

(Continued)

*Primary Examiner* — Jeffrey O'Brien
(74) *Attorney, Agent, or Firm* — COOPER LEGAL GROUP LLC

(57) ABSTRACT

The present invention discloses a universal wheel. A roller is rotationally connected to a mounting base. One side of the roller is provided with an annular channel and limiting grooves. The mounting base is provided with an arc-shaped elastic limiting through hole, a locking position, an unlocking position, and a positioning part. A middle position of a brake lever is pivotally connected to the mounting base, with one end for driving and the other end for a brake rod to pass through and slide and push the positioning part, enabling the brake rod to switch between the locking position and unlocking position. The present invention simplifies an assembly process while implementing effective braking.

10 Claims, 10 Drawing Sheets

(56) References Cited

U.S. PATENT DOCUMENTS

| | | | | |
|---|---|---|---|---|
| 7,937,805 | B2 * | 5/2011 | Tsai | B60B 33/0028 16/35 R |
| 7,950,108 | B2 * | 5/2011 | Yang | B60B 33/0049 16/35 R |
| 7,987,553 | B2 * | 8/2011 | Lin | B60B 33/0042 16/35 R |
| 8,302,257 | B2 * | 11/2012 | Lin | B60B 33/0057 16/48 |
| 8,819,894 | B2 * | 9/2014 | Hamasaki | B60B 33/025 16/35 R |
| 8,991,007 | B2 * | 3/2015 | Tsai | B60B 33/0084 16/35 R |
| 9,211,762 | B1 * | 12/2015 | Tsai | B60B 33/0042 |
| 9,908,367 | B2 * | 3/2018 | Yamamoto | B60B 33/0078 |
| 11,904,634 | B2 * | 2/2024 | Furuta | B60B 33/0086 |
| 12,285,975 | B2 * | 4/2025 | Kolar | B60B 33/0021 |
| 2002/0189051 | A1 * | 12/2002 | Holbrook | B60B 33/0068 16/18 R |
| 2026/0116124 | A1 * | 4/2026 | Park | A45C 5/145 |

FOREIGN PATENT DOCUMENTS

| | | | | | |
|---|---|---|---|---|---|
| DE | 4142484 | A1 | * | 6/1993 | B60B 33/0086 |
| JP | H09290604 | A | * | 11/1997 | |

* cited by examiner

UNIVERSAL WHEEL

CROSS-REFERENCE TO RELATED APPLICATIONS

This application claims priority to Chinese Patent Application 202422041549.7, filed on Aug. 20, 2024, which is incorporated herein by reference.

TECHNICAL FIELD

The present invention relates to the technical field of casters, and in particular to a universal wheel.

BACKGROUND

Universal wheels, also known as swivel casters or universal casters, feature a unique rotating structure that allows 360-degree free rotation in a horizontal direction, thereby significantly enhancing the flexibility and mobility of a device or an object equipped with the universal wheels. A braking function of the universal wheels is a crucial aspect of design, which is primarily used to provide a braking effect when needed, to ensure that the device or object equipped with the universal wheels can be stably parked or decelerated.

Braking structures of existing universal wheels typically utilize a combination of spring clips. These structures are relatively complex, involving coordination among a plurality of parts, which not only increases manufacturing costs, but also raises a risk of a brake failure. Moreover, an assembly process is cumbersome, making it unfavorable for maintenance and replacement.

SUMMARY

The present invention is intended to provide a universal wheel to simplify an assembly process and reduce manufacturing costs while ensuring effective braking.

To achieve the above purpose, solutions provided in the present invention are as follows: a universal wheel, including a mounting base, a roller, and a brake lever. The roller is rotationally connected to the mounting base, and an annular channel and several limiting grooves are provided on one side of the roller near the mounting base; a position of the mounting base corresponding to the limiting grooves and the annular channel is provided with an arc-shaped elastic limiting through hole, one end of the elastic limiting through hole serves as a locking position, and the other end of the elastic limiting through hole serves as an unlocking position, and a narrowed positioning part is formed between the locking position and the unlocking position; and a middle position of the brake lever is pivotally connected to the mounting base, with one end of the brake lever serving as a driving part and the other end of the brake lever serving as a clamping part, the clamping part is provided with a brake rod that passes through the elastic limiting through hole, the driving part drives the brake rod of the clamping part to slide and push the positioning part, enabling the brake rod to switch between the locking position and the unlocking position, and when the brake rod is at the locking position, the brake rod enters the limiting grooves from the annular channel, or when the brake rod is at the unlocking position, the brake rod retracts from the limiting grooves back into the annular channel.

In a preferred solution, the mounting base includes an arc-shaped cover and an elastic support plate, an inner arc-shaped surface of the arc-shaped cover is radially provided with the elastic support plate, and the elastic support plate is provided with the arc-shaped elastic limiting through hole along an axial direction of the arc-shaped cover.

In a preferred solution, the arc-shaped cover is provided with a clearance opening, the elastic support plate is provided with a clearance through hole between the elastic limiting through hole and the clearance opening, an arch-shaped positioning part is formed between the clearance through hole and the elastic limiting through hole, and a middle position of the brake lever is pivotally connected to the clearance opening.

In a preferred solution, the present invention further includes a brake shaft, where a middle position of the brake lever is provided with a brake shaft hole, the clearance opening is provided with a first connecting lug, the first connecting lug is provided with a first through hole, the brake shaft passes through the first through hole of the first connecting lug, and the brake shaft hole of the brake lever pivotally connects the brake lever to the arc-shaped cover.

In a preferred solution, the clamping part at one end of the brake lever is provided with a second connecting lug, the second connecting lug is provided with a second through hole, and the brake rod passes through the second through hole of the second connecting lug and the elastic limiting through hole of the elastic support plate.

In a preferred solution, the present invention further includes a horizontal shaft, where the elastic support plate is provided with a horizontal shaft through hole along an axial direction of the arc-shaped cover, a mounting hole is provided at a center of a circle of the roller, and the horizontal shaft passes through the horizontal shaft through hole and is rotationally connected to the mounting hole of the roller.

In a preferred solution, the horizontal shaft is provided with a first necked section, the mounting hole of the roller is provided with a first anti-detachment clamping position, and the horizontal shaft is rotationally connected to the roller through the cooperation of the first necked section and the first anti-detachment clamping position.

In a preferred solution, several positioning sheets are evenly distributed along an inner circumferential wall of the roller near the arc-shaped cover and around the center of a circle of the roller, and the limiting grooves are formed between adjacent positioning sheets.

In a preferred solution, the present invention further includes a connecting shaft, where the connecting shaft is rotationally connected to the mounting base, and the mounting base is connected to another object through the connecting shaft.

In a preferred solution, one end of the connecting shaft is provided with straight-thread teeth, while the other end of the connecting shaft is provided with a second necked section, the mounting base is provided with a second anti-detachment clamping position, one end of the connecting shaft is connected to an object through the straight-thread teeth, while the other end of the connecting shaft is rotationally connected to the mounting base through the cooperation of the second necked section and the second anti-detachment clamping position.

After the above solutions are used, beneficial effects of the present invention are as follows: In the present invention, the brake lever controls the brake rod to slide and push the positioning part of the elastic limiting through hole, to implement switching between the locking position and the unlocking position. This allows the brake rod to enter the limiting grooves from the annular channel or retract from the limiting grooves back into the annular channel, thereby implementing locking or unlocking of the roller, providing a simple structure and easy operation, and facilitating manufacturing and cost control.

DESCRIPTION OF REFERENCE NUMERALS

1, mounting base; 10, arc-shaped cover; 101, clearance opening; 1011, first connecting lug; 1012, first through hole; 11, elastic support plate; 110, elastic limiting through hole; 1100, locking position; 1101, unlocking position; 1102, positioning part; 111, clearance through hole; 112, horizontal shaft through hole; 12, second anti-detachment clamping position; 2, roller; 20, annular channel; 21, limiting groove; 210, positioning sheet; 22, mounting hole; 220, first anti-detachment clamping position; 3, brake lever; 31, brake shaft hole; 32, driving part; 33, clamping part; 331, second connecting lug; 332, second through hole; 4, brake rod; 5, brake shaft; 6, horizontal shaft; 61, first necked section; 7, connecting shaft; 71, straight-thread teeth; 72, second necked section.

DESCRIPTION OF EMBODIMENTS

The present invention is further illustrated below in conjunction with accompanying drawings and specific embodiments.

Figure 8:
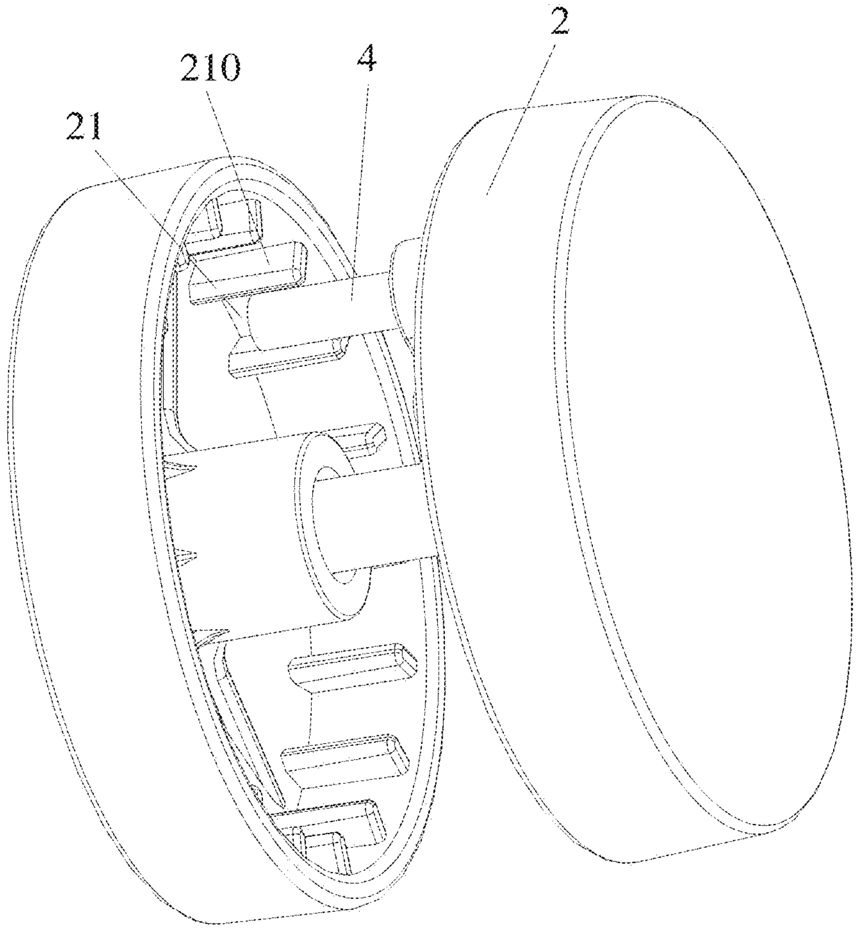
FIG. 8 is a schematic diagram showing a brake rod entering limiting grooves after the mounting base is removed according to the present invention.

This embodiment provides a universal wheel, as shown in FIG. 1 to FIG. 10, including a mounting base 1, a roller 2, and a brake lever 3. The roller 2 is rotationally connected to the mounting base 1, and a side of the roller 2 near the mounting base 1 is provided with an annular channel 20 and several limiting grooves 21. A position of the mounting base 1 corresponding to the limiting grooves 21 and the annular channel 20 is provided with an arc-shaped elastic limiting through hole 110. One end of the elastic limiting through hole 110 serves as a locking position 1100, and the other end of the elastic limiting through hole 110 serves as an unlocking position 1101. A narrowed positioning part 1102 is formed between the locking position 1100 and the unlocking position 1101. A middle position of the brake lever 3 is pivotally connected to the mounting base 1, with one end of the brake lever 3 serving as a driving part 32 and the other end of the brake lever 3 serving as a clamping part 33. The clamping part 33 is provided with a brake rod 4 that passes through the elastic limiting through hole 110. The driving part 32 drives the brake rod 4 of the clamping part 33 to slide and push the positioning part 1102, enabling the brake rod 4 to switch between the locking position 1100 and the unlocking position 1101. When the brake rod 4 is at the locking position 1100, the brake rod 4 enters the limiting grooves 21 from the annular channel 20. As shown in FIG. 8, when the brake rod 4 is at the unlocking position 1101, the brake rod 4 retracts from the limiting grooves 21 back into the annular channel 20.

In this embodiment, rapid locking and unlocking of the roller 2 can be implemented by operating the brake lever 3, enabling the device to stop moving quickly when needed, thereby improving safety during use. The brake rod 4 can enter the limiting grooves 21 of the roller 2 when being at the locking position 1100, ensuring stability and reliability during braking. Because the limiting through hole in this embodiment is elastically provided, and the narrowed positioning part 1102 is formed between the locking position 1100 and the unlocking position 1101, the brake rod 4 can push the positioning part 1102 when switching between the locking position 1100 and the unlocking position 1101. In addition, the positioning part 1102 can continuously position the brake rod 4, ensuring that the brake rod 4 remains stably at the locking position 1100 or the unlocking position 1101. The design is ingenious. In this embodiment, several limiting grooves 21 are provided in an inner circumferential wall of the roller 2 near the mounting base 1. A region between the limiting grooves 21 and a center of a circle of the roller 2 is the annular channel 20. In other embodiments, the limiting grooves 21 can alternatively be positioned near the center of a circle of the roller 2, while the inner circumferential wall of the roller 2 is configured as the annular channel 20, so that the locking position 1100 and the unlocking position 1101 can be interchangeable, meeting different requirements.

Figure 6:
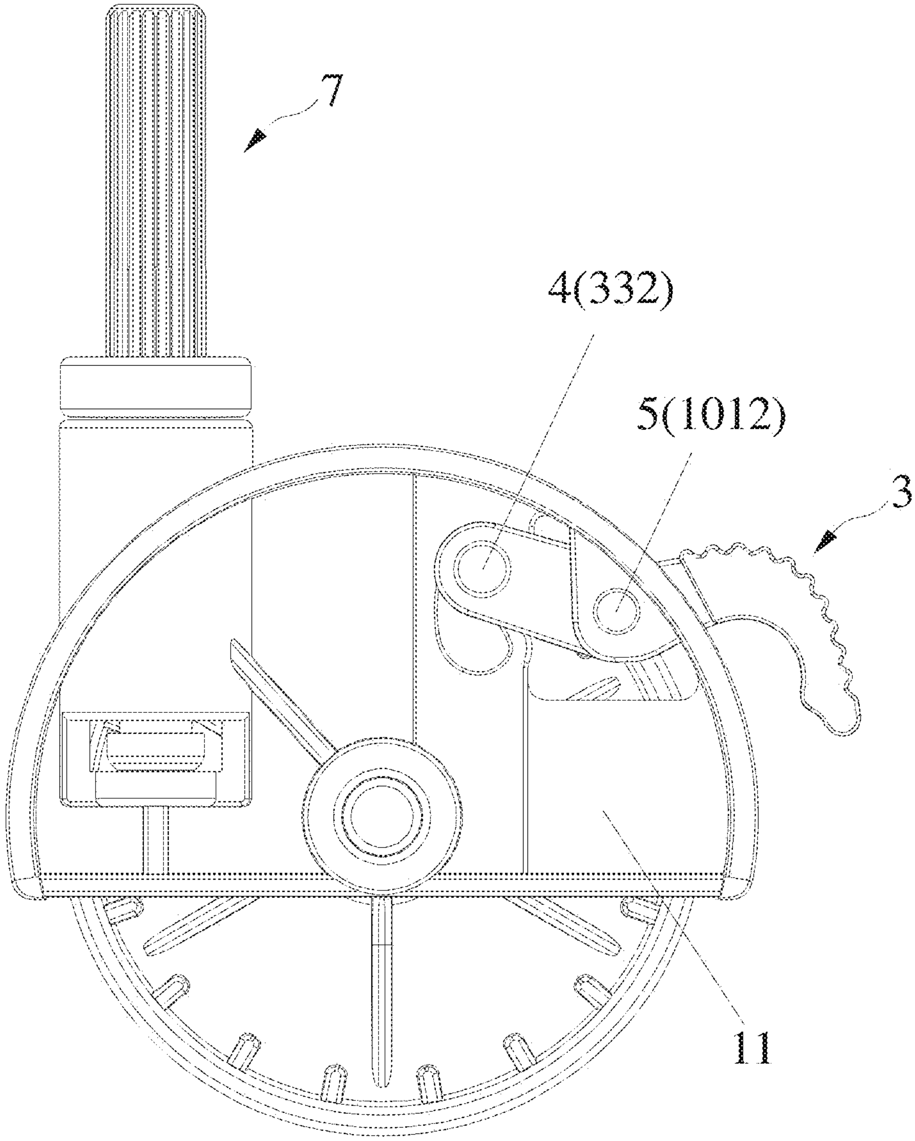
FIG. 6 is a right side view of the present invention with a right roller removed.
Figure 7:
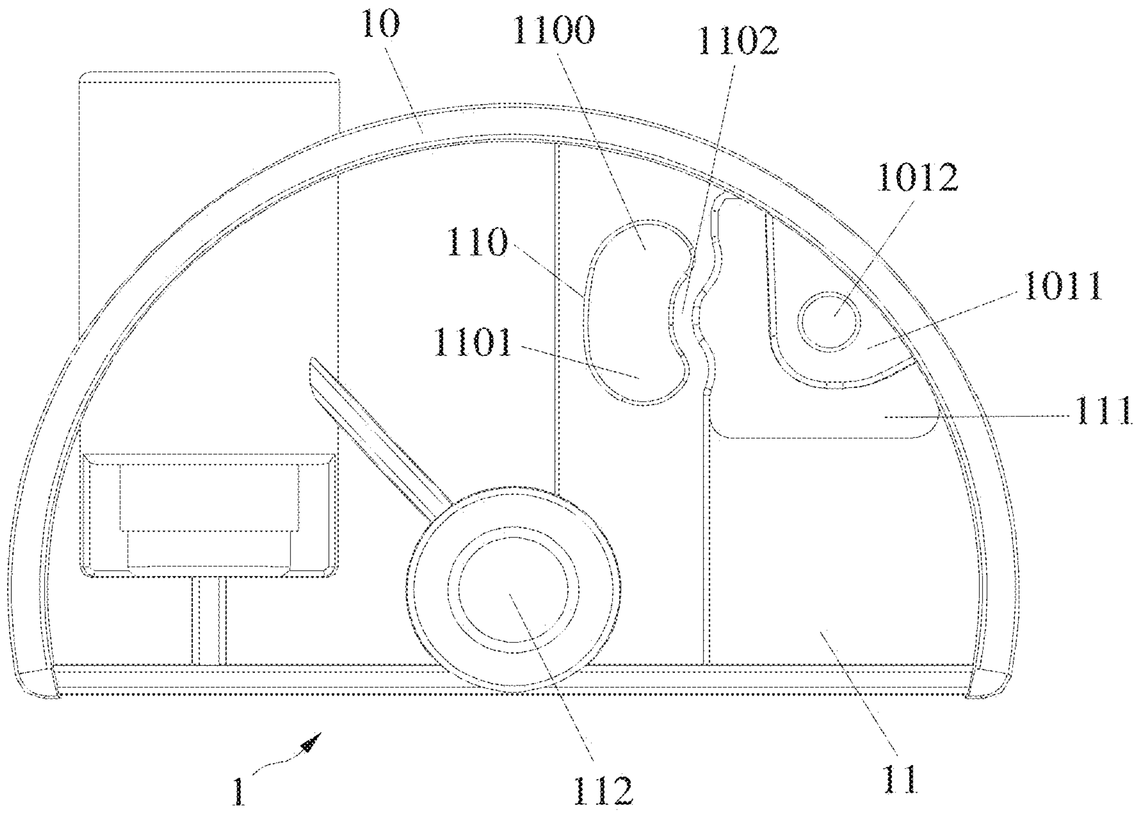
FIG. 7 is a right side view of a mounting base of the present invention.

As shown in FIG. 6, the mounting base 1 includes an arc-shaped cover 10 and an elastic support plate 11. An inner arc-shaped surface of the arc-shaped cover 10 is radially provided with the elastic support plate 11, and the elastic support plate 11 is provided with the arc-shaped elastic limiting through hole 110 along an axial direction of the arc-shaped cover 10. The arc-shaped cover 10 in this embodiment can be of any shape, including a semi-circular shape, a shape larger than the semi-circular shape, or a shape smaller than the semi-circular, which has a sufficient support strength and provides stable support for the roller 2 and a braking mechanism, ensuring greater stability during rotation of the roller 2. The elastic support plate 11 enables the elastic limiting through hole 110 to have a specific elasticity, allowing deformation during pushing of the brake rod 4. This satisfies the switching of the brake rod 4 between the locking position 1100 and the unlocking position 1101 and provides a simple structure.

Figure 1:
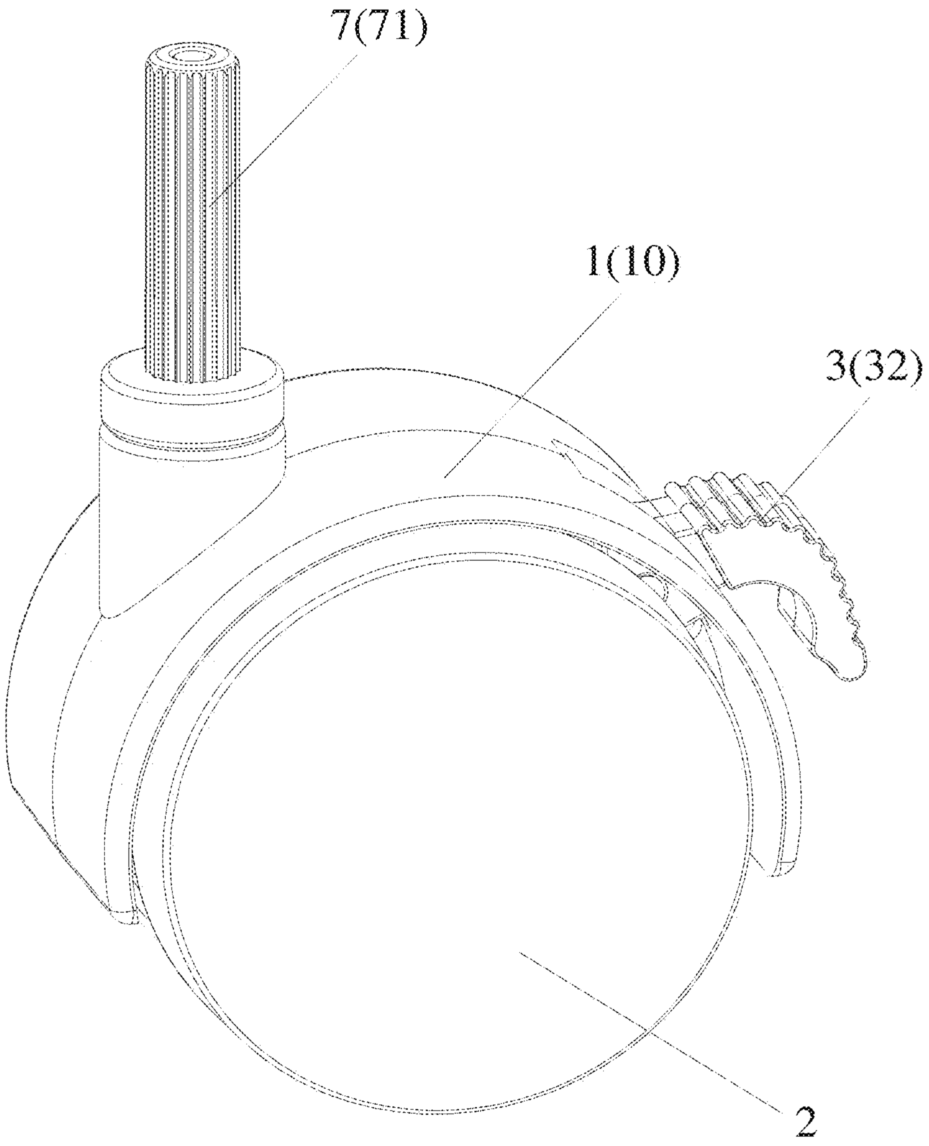
FIG. 1 is a structural schematic diagram of the present invention.
Figure 2:
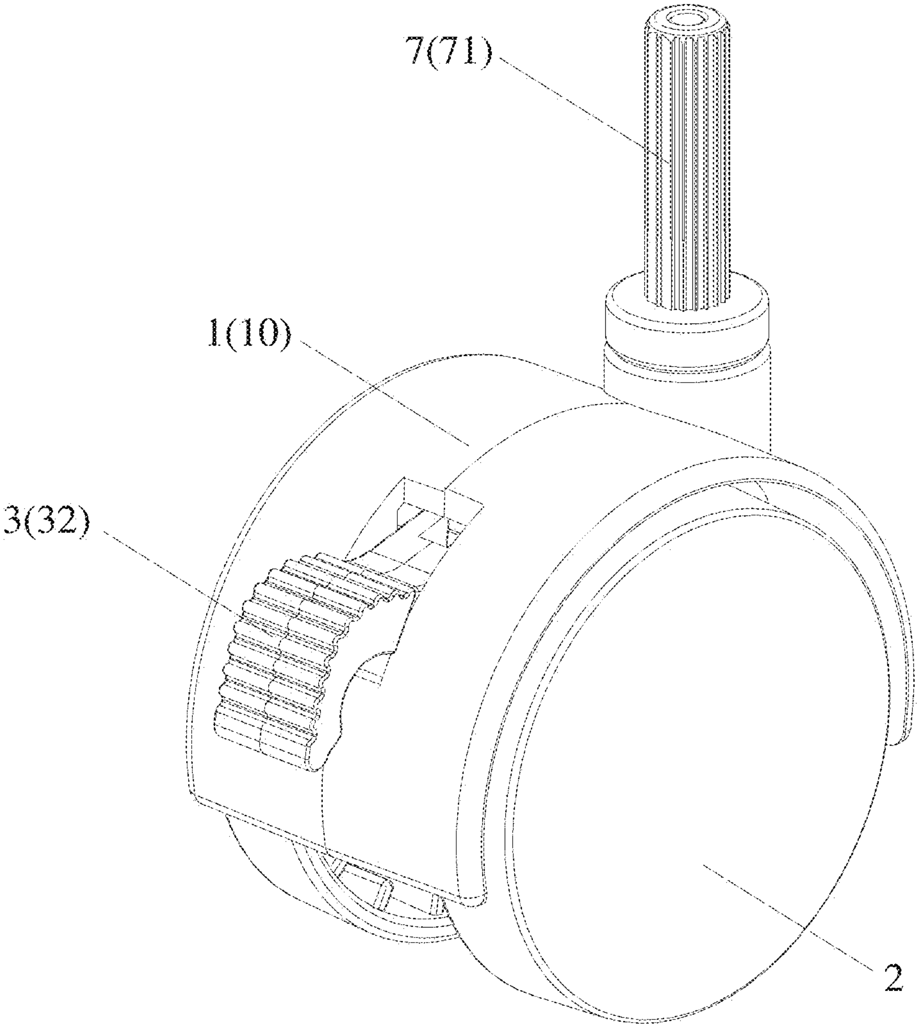
FIG. 2 is a structural schematic diagram of the present invention from another perspective.
Figure 3:
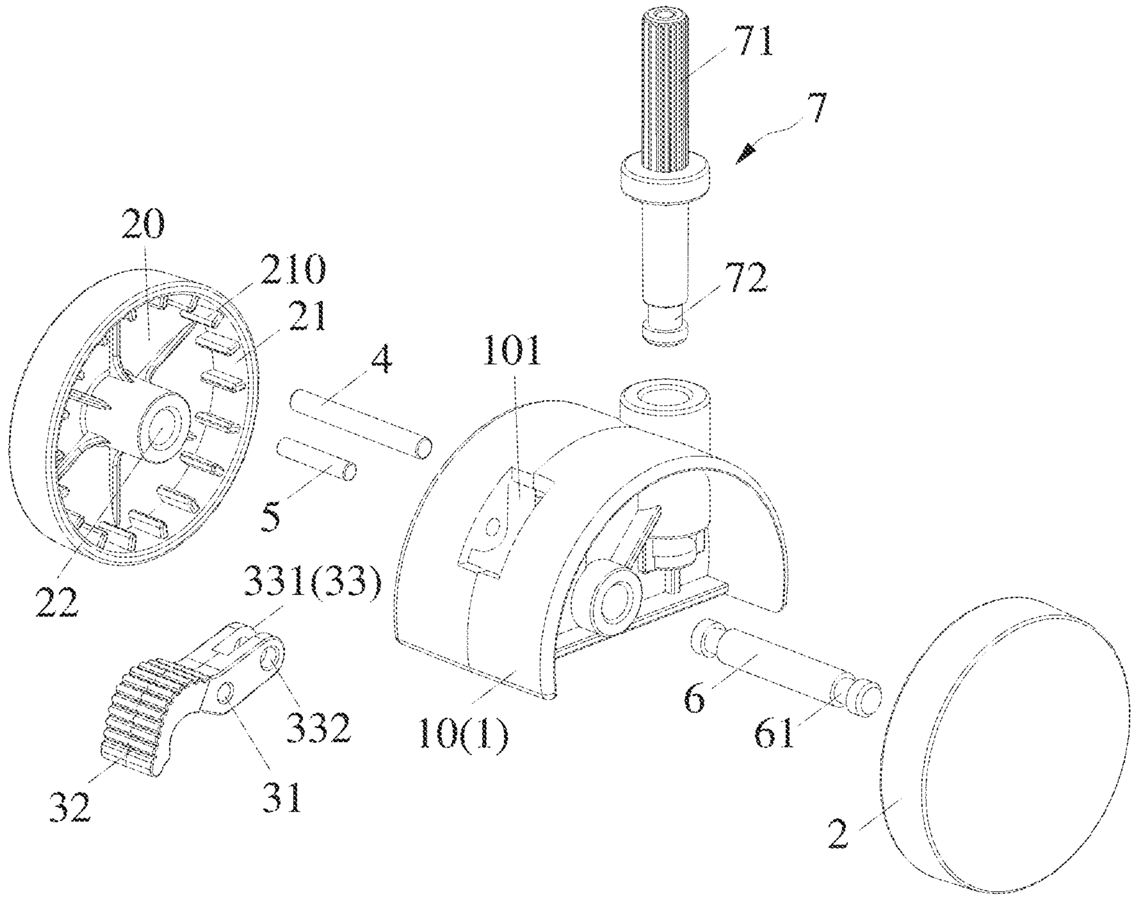
FIG. 3 is an exploded structural schematic diagram of the present invention.

As shown in FIG. 3 and FIG. 6, the arc-shaped cover 10 is provided with a clearance opening 101, and the elastic support plate 11 is provided with a clearance through hole 111 between the elastic limiting through hole 110 and the clearance opening 101. An arch-shaped positioning part 1102 is formed between the clearance through hole 111 and the elastic limiting through hole 110, and a middle position of the brake lever 3 is pivotally connected to the clearance opening 101. The clearance opening 101 and the clearance through hole 111 in this embodiment allow the brake lever 3 to be installed on the arc-shaped cover 10 without occupying excessive space. The arch-shaped positioning part 1102 is formed between the clearance through hole 111 and the elastic limiting through hole 110, which can position the brake rod 4, ensuring that the brake rod 4 remains stably at the locking position 1100 or the unlocking position 1101 and can be easily used.

As shown in FIG. 3 to FIG. 6, this embodiment further includes a brake shaft 5. A middle position of the brake lever 3 is provided with a brake shaft hole 31, and the clearance opening 101 is provided with a first connecting lug 1011. The first connecting lug 1011 is provided with a first through hole 1012. The brake shaft 5 passes through the first through hole 1012 of the first connecting lug 1011 and the brake shaft hole 31 of the brake lever 3, to pivotally connect the brake lever 3 to the arc-shaped cover 10, enhancing the stability. The brake lever 3 is pivotally connected to the first connecting lug 1011 on the arc-shaped cover 10 through the brake shaft 5, ensuring flexible rotation of the brake lever 3 and facilitating assembly, disassembly, and maintenance for a user when needed.

Figure 4:
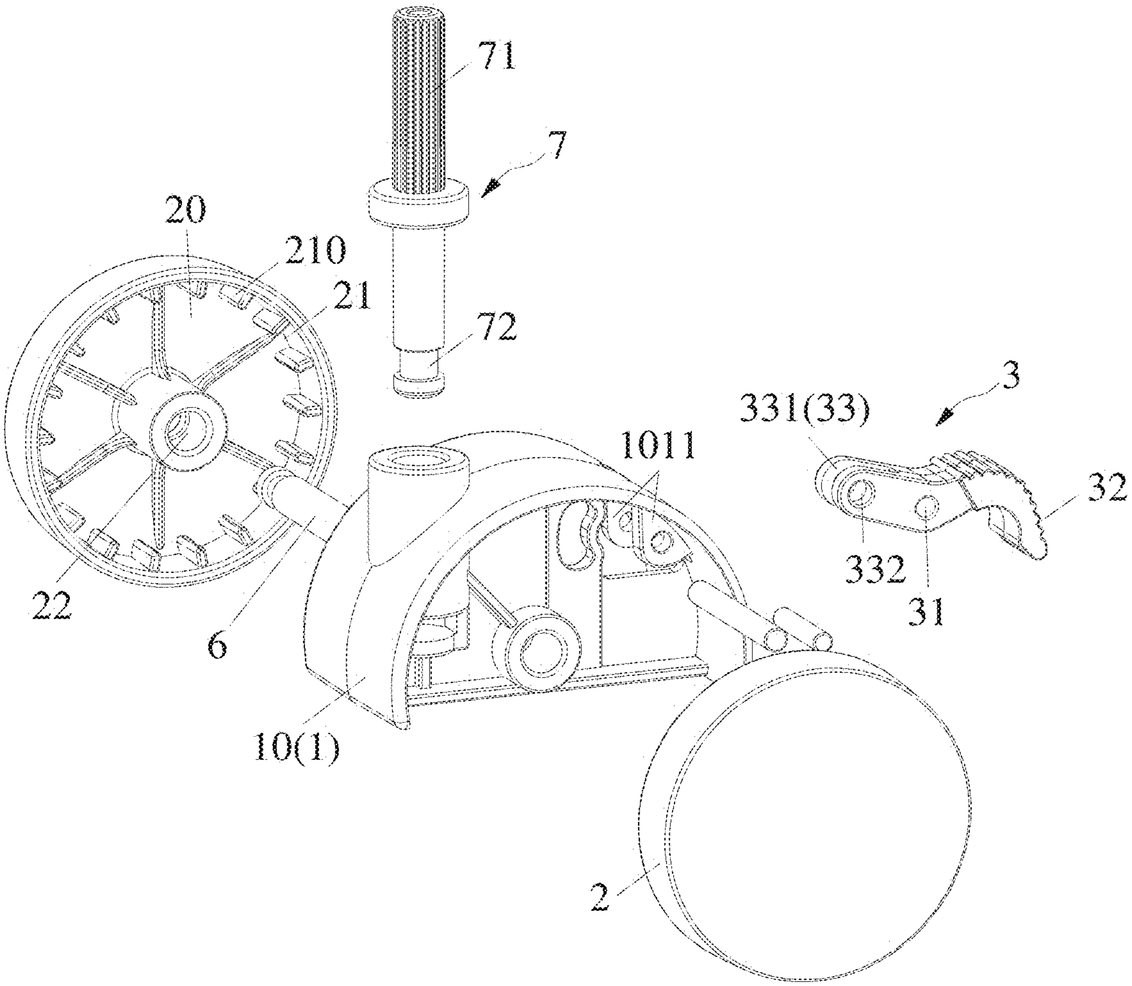
FIG. 4 is an exploded structural schematic diagram of the present invention from another perspective.
Figure 5:
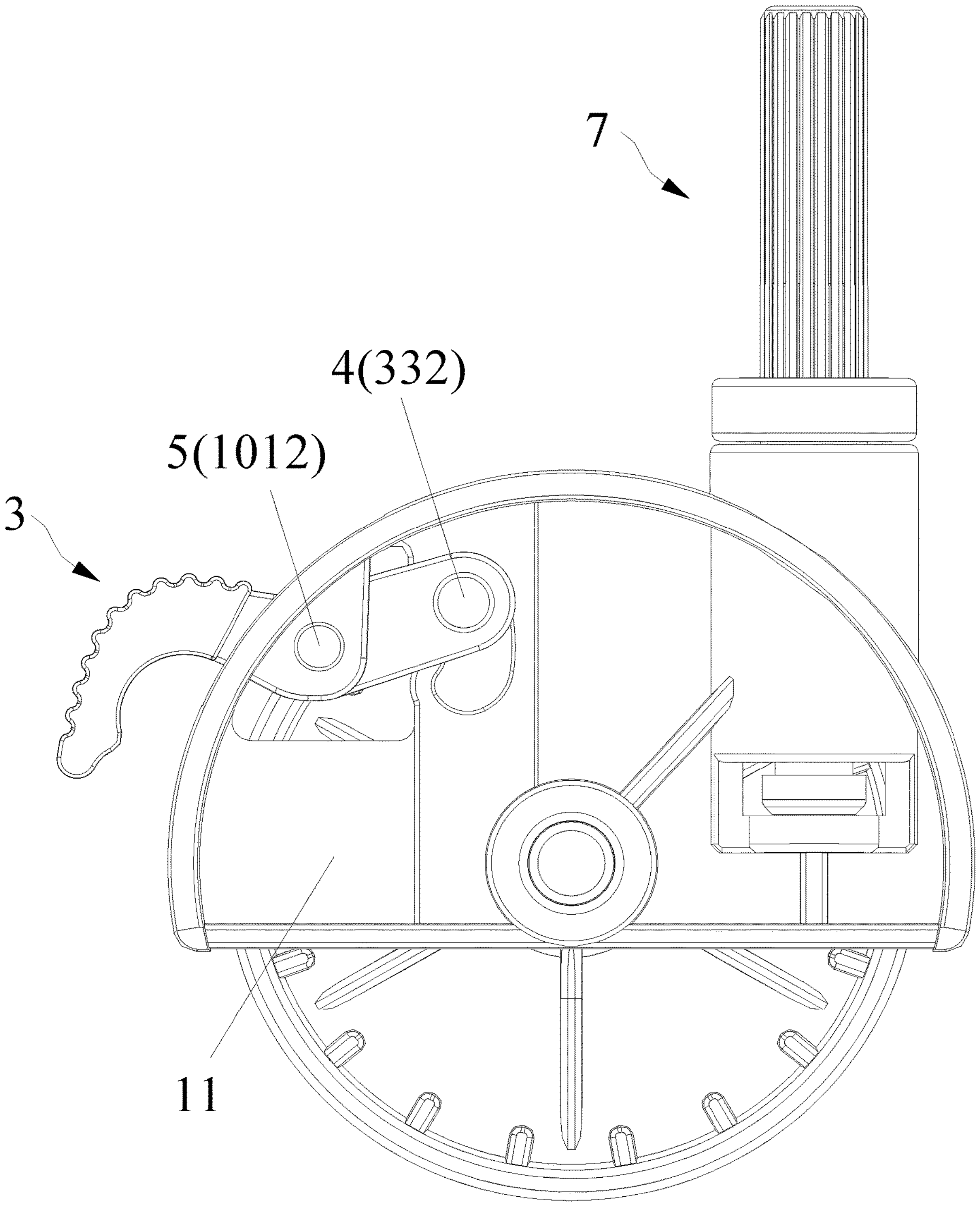
FIG. 5 is a left side view of the present invention with a left roller removed.

As shown in FIG. 3 and FIG. 4, the clamping part 33 at one end of the brake lever 3 is provided with a second connecting lug 331, and the second connecting lug 331 is provided with a second through hole 332. The brake rod 4 passes through the second through hole 332 of the second connecting lug 331 and the elastic limiting through hole 110 of the elastic support plate 11. In this embodiment, the brake rod 4 serves as a structure for controlling braking of the universal wheel. The brake rod 4 is disposed at one end of the brake lever 3 and passes through the elastic limiting through hole 110. A diameter of the brake rod 4 matches a width of the locking position 1100 and a width of the unlocking position 1101 on the elastic limiting through hole 110, and is larger than a width of the positioning part 1102. This allows the brake lever 3 to drive the brake rod 4 to push the positioning part 1102, implementing switching between the locking position 1100 and the unlocking position 1101, and providing a simple and user-friendly structure.

As shown in FIG. 3, this embodiment further includes a horizontal shaft 6. The elastic support plate 11 is provided with a horizontal shaft through hole 112 along an axial direction of the arc-shaped cover 10. A mounting hole 22 is provided at the center of a circle of the roller 2. The horizontal shaft 6 passes through the horizontal shaft through hole 112 and is rotationally connected to the mounting hole 22 of the roller 2. In this embodiment, the horizontal shaft 6 passes through the horizontal shaft through hole 112 in the elastic support plate 11 and is rotationally connected to the mounting hole 22 of the roller 2, providing stable support for the roller 2. This ensures that the roller 2 does not wobble or shift due to an uneven force during rotation, thereby improving overall stability of the universal wheel.

Figure 9:
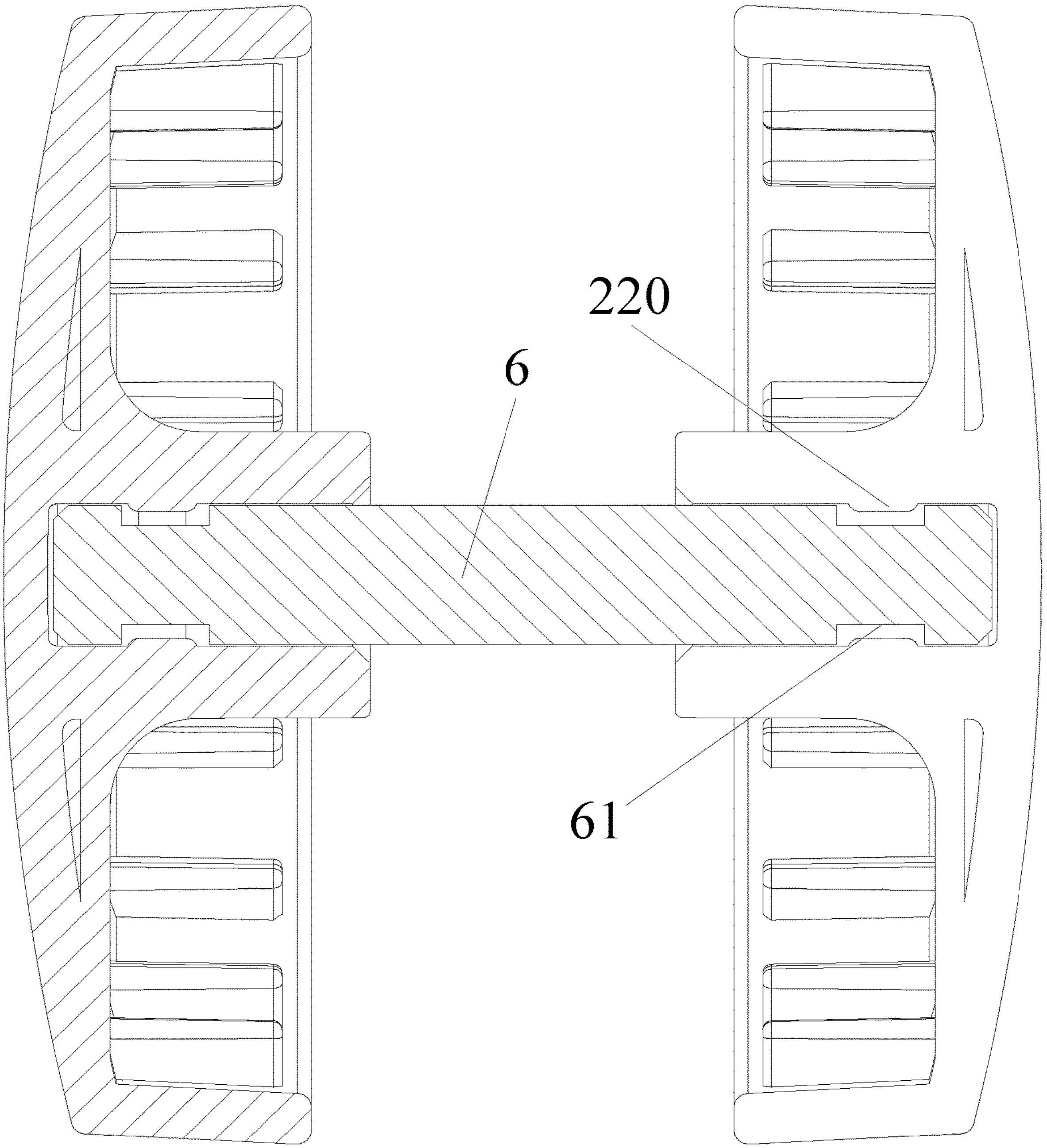
FIG. 9 is a sectional view showing a roller connected to a horizontal shaft according to the present invention.
Figure 10:
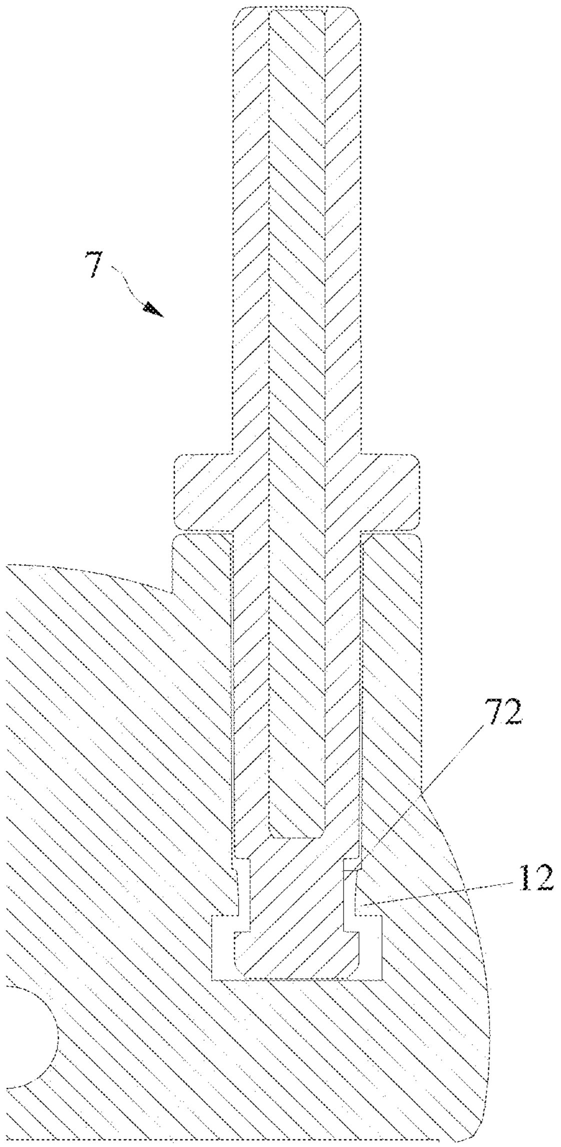
FIG. 10 is a sectional view showing a connecting shaft connected to the mounting base according to the present invention.

As shown in FIG. 3 and FIG. 9, the horizontal shaft 6 is provided with a first necked section 61. A first anti-detachment clamping position 220 is disposed inside the mounting hole 22 of the roller 2. The horizontal shaft 6 is rotationally connected to the roller 2 through cooperation of the first necked section 61 and the first anti-detachment clamping position 220. In this embodiment, the cooperation of the first necked section 61 and the first anti-detachment clamping position 220 simplifies a mounting process of the roller 2. The mounting hole 22 of the roller 2 is only aligned with the first necked section 61 of the horizontal shaft 6 and is pressed firmly to implement connection, without additional fastener or tool, implementing easy use.

As shown in FIG. 3 and FIG. 4, in this embodiment, several positioning sheets 210 are evenly distributed around a center of a circle of the roller 2 along an inner circumferential wall of the roller 2 near the arc-shaped cover 10. The Limiting grooves 21 are formed between adjacent positioning sheets 210. Through the cooperation of a limiting groove and the brake rod 4, when the brake rod 4 is at the locking position 1100, the brake rod 4 enters the limiting groove to implement braking. When the brake rod 4 is at the unlocking position 1101, the brake rod 4 exits the limiting groove. The design is ingenious. In other embodiments, a quantity and positions of the positioning sheets 210 can alternatively be adjusted.

As shown in FIG. 1 to FIG. 6, this embodiment also includes a connecting shaft 7. The connecting shaft 7 is rotationally connected to the mounting base 1, and the mounting base 1 is connected to another object through the connecting shaft 7. The rotational connection of the connecting shaft 7 allows the universal wheel to rotate freely in a plurality of directions, further enhancing flexibility.

As shown in FIG. 1 to FIG. 6 and FIG. 10, one end of the connecting shaft 7 is provided with straight-thread teeth 71, while the other end of the connecting shaft 7 is provided with a second necked section 72. The mounting base 1 is provided with a second anti-detachment clamping position 12. One end of the connecting shaft 7 is connected to an object through the straight-thread teeth 71, while the other end of the connecting shaft 7 is rotationally connected to the mounting base 1 through the cooperation of the second necked section 72 and the second anti-detachment clamping position 12. In this embodiment, the second necked section 72 of the connecting shaft 7 cooperates with the second anti-detachment clamping position 12 of the mounting base 1, ensuring that a mounting process is simplified while the connecting shaft 7 can rotate on the mounting base 1. One end of the connecting shaft 7 is provided with the straight-thread teeth 71. During mounting, the straight-thread teeth 71 are connected to a mounting hole 22 on another object. The straight-thread teeth 71 and a wall of the mounting hole 22 press against each other, thereby providing a fastening effect. The universal wheel provided in this embodiment can be connected to other objects such as a storage box and a storage cabinet through the connecting shaft 7, which is not limited thereto, providing a simple, practical, and user-friendly structure and facilitating production and cost control.

A use process of the present invention is as follows:

The user first places the brake lever 3 at the clearance opening 101 of the arc-shaped cover 10, then passes the brake shaft 5 through the first through hole 1012 of the first connecting lug 1011 on the arc-shaped cover 10 and the brake shaft hole 31 of the brake lever 3, to pivotally connect the brake lever 3 to the arc-shaped cover 10. Subsequently, the user passes brake rod 4 through the second through hole 332 of the second connecting lug 331 and the elastic limiting through hole 110 of the elastic support plate 11.

The horizontal shaft 6 passes through the horizontal shaft through hole 112 of the elastic support plate 11. Because both ends of the horizontal shaft 6 are provided with the first necked section 61, and the first anti-detachment clamping position 220 is provided inside the mounting hole 22 of the roller 2, the mounting hole 22 of the roller 2 is aligned with an end of the horizontal shaft 6 and pressed firmly. The first necked section 61 is engaged with the first anti-detachment clamping position 220, allowing the roller 2 to be rotationally connected to the horizontal shaft 6.

One end of the connecting shaft 7 is provided with the straight-thread teeth 71, while the other end is provided with the second necked section 72. The mounting base 1 is provided with the second anti-detachment clamping position 12. The other end of the connecting shaft 7 is aligned with the second anti-detachment clamping position 12 of the mounting base 1 and pressed firmly. The second necked section 72 is engaged with the second anti-detachment clamping position 12, allowing the connecting shaft 7 to be rotationally connected to the horizontal shaft 6. When the straight-thread teeth 71 at one end of the connecting shaft 7 are inserted into a mounting hole 22 in another object, the straight-thread teeth 71 and a wall of the mounting hole 22 press against each other, thereby providing a fastening effect.

The driving part 32 of the brake lever 3 drives the brake rod 4 on the clamping part 33 to slide and push the positioning part 1102, enabling the brake rod 4 to switch between the locking position 1100 and the unlocking position 1101. When the brake rod 4 is at the locking position 1100, the brake rod 4 enters the limiting grooves 21 from the annular channel 20. When the brake rod 4 is at the unlocking position 1101, the brake rod 4 exits the limiting grooves 21 and returns to the annular channel 20, implementing braking and unlocking.

Orientation terms mentioned in this specification are defined relative to structures shown in the accompanying drawings. The orientation terms are relative concepts and may vary accordingly depending on different positions and use states. Therefore, these or other orientation terms should not be interpreted as restrictive terms.

The above description is merely a preferred embodiment of the present invention and does not limit the design of this specification. Any equivalent modifications made based on the design principles of this specification fall within the scope of protection of this specification.

The invention claimed is:

1. A universal wheel, comprising a mounting base, a roller, and a brake lever, wherein the roller is rotationally connected to the mounting base, and an annular channel and at least two limiting grooves are provided on one side of the roller near the mounting base;

a position of the mounting base corresponding to the at least two limiting grooves and the annular channel is provided with an arc-shaped elastic limiting through hole, one end of the arc-shaped elastic limiting through hole serves as a locking position, a second end of the arc-shaped elastic limiting through hole serves as an unlocking position, and a narrowed positioning part is formed between the locking position and the unlocking position; and a middle position of the brake lever is pivotally connected to the mounting base, with one end of the brake lever serving as a driving part and a second end of the brake lever serving as a clamping part, the clamping part is provided with a brake rod that passes through the arc-shaped elastic limiting through hole, the driving part drives the brake rod of the clamping part to slide and push the narrowed positioning part, enabling the brake rod to switch between the locking position and the unlocking position, when the brake rod is at the locking position, the brake rod enters the at least two limiting grooves from the annular channel, and when the brake rod is at the unlocking position, the brake rod retracts from the at least two limiting grooves back into the annular channel.

2. The universal wheel according to claim 1, wherein the mounting base comprises an arc-shaped cover and an elastic support plate, an inner arc-shaped surface of the arc-shaped cover is radially provided with the elastic support plate, and the elastic support plate is provided with the arc-shaped elastic limiting through hole along an axial direction of the arc-shaped cover.

3. The universal wheel according to claim 2, wherein the arc-shaped cover is provided with a clearance opening, the elastic support plate is provided with a clearance through hole between the arc-shaped elastic limiting through hole and the clearance opening, an arch-shaped positioning part is formed between the clearance through hole and the arc-shaped elastic limiting through hole, and the middle position of the brake lever is pivotally connected to the clearance opening.

4. The universal wheel according to claim 3, further comprising a brake shaft, wherein the middle position of the brake lever is provided with a brake shaft hole, the clearance opening is provided with a first connecting lug, the first connecting lug is provided with a first through hole, the brake shaft passes through the first through hole of the first connecting lug, and the brake shaft hole of the brake lever pivotally connects the brake lever to the arc-shaped cover.

5. The universal wheel according to claim 4, wherein the clamping part at the second end of the brake lever is provided with a second connecting lug, the second connecting lug is provided with a second through hole, and the brake rod passes through the second through hole of the second connecting lug and the arc-shaped elastic limiting through hole of the elastic support plate.

6. The universal wheel according to claim 2, further comprising a horizontal shaft, wherein the elastic support plate is provided with a horizontal shaft through hole along the axial direction of the arc-shaped cover, a mounting hole is provided at a center of a circle of the roller, and the horizontal shaft passes through the horizontal shaft through hole and is rotationally connected to the mounting hole of the roller.

7. The universal wheel according to claim 6, wherein the horizontal shaft is provided with a first necked section, the mounting hole of the roller is provided with a first anti-detachment clamping position, and the horizontal shaft is rotationally connected to the roller through cooperation of the first necked section and the first anti-detachment clamping position.

8. The universal wheel according to claim 2, wherein at least two positioning sheets are evenly distributed around a center of a circle of the roller along an inner circumferential wall of the roller near the arc-shaped cover, and the at least two limiting grooves are formed between adjacent positioning sheets of the at least two positioning sheets.

9. The universal wheel according to claim 1, further comprising a connecting shaft, wherein the connecting shaft is rotationally connected to the mounting base, and the mounting base is connected to an object through the connecting shaft.

10. The universal wheel according to claim 9, wherein one end of the connecting shaft is provided with straight-thread teeth, while a second end of the connecting shaft is provided with a second necked section, the mounting base is provided with a second anti-detachment clamping position, and the one end of the connecting shaft is connected to the object through the straight-thread teeth, while the second end of the connecting shaft is rotationally connected to the mounting base through cooperation of the second necked section and the second anti-detachment clamping position.

* * * * *